US010639636B2

(12) United States Patent
Wilkinson et al.

(10) Patent No.: US 10,639,636 B2
(45) Date of Patent: May 5, 2020

(54) CLOSED KIT FOR TISSUE CONTAINMENT AND STABILIZATION FOR MOLECULAR AND HISTOPATHOLOGY DIAGNOSTICS

(71) Applicant: Becton, Dickinson and Company, Franklin Lakes, NJ (US)

(72) Inventors: Bradley M. Wilkinson, North Haledon, NJ (US); C. Mark Newby, Tuxedo, NY (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 15/692,463

(22) Filed: Aug. 31, 2017

(65) Prior Publication Data
US 2017/0361317 A1    Dec. 21, 2017

Related U.S. Application Data

(63) Continuation of application No. 12/257,057, filed on Oct. 23, 2008, now abandoned.
(Continued)

(51) Int. Cl.
*B01L 3/00* (2006.01)
*G01N 1/36* (2006.01)
*G01N 1/31* (2006.01)

(52) U.S. Cl.
CPC .............. *B01L 3/508* (2013.01); *G01N 1/312* (2013.01); *G01N 1/36* (2013.01);
(Continued)

(58) Field of Classification Search
CPC ... B01L 3/508; B01L 3/50; B01L 3/00; G01N 1/36; G01N 1/312; G01N 1/31; G01N 1/00
(Continued)

(56) References Cited

U.S. PATENT DOCUMENTS 3,918,920 A   11/1975  Barber
3,977,794 A    8/1976  Liedholz
(Continued)

FOREIGN PATENT DOCUMENTS

CN    1501080 A    6/2004
DE    20201894 U1  5/2002
(Continued)

OTHER PUBLICATIONS

"12×32mm Screw Top Wide Mouth (9mm) Vials", Chromtech, 2009, pp. 319.

*Primary Examiner* — Christine T Mui
(74) *Attorney, Agent, or Firm* — The Webb Law Firm

(57) ABSTRACT

A container for storing a biological sample is disclosed. The container includes a housing having a closed end, an open end, and a sidewall extending therebetween defining a container interior. The container has a removable closure for enclosing the open end of the housing and a sample holder for housing a biological sample detachably connected to the closure and insertable within the container interior. A port is disposed within the closure adjacent the sample holder to allow fluid to pass therethrough into the container interior. An injection device for engaging the port may also be provided. A first fluid may be initially provided within the container interior and a second fluid may be subsequently injected by the injection device through the port into the container interior.

21 Claims, 7 Drawing Sheets

Related U.S. Application Data

(60) Provisional application No. 60/982,049, filed on Oct. 23, 2007.

(52) U.S. Cl.
CPC ... *B01L 2200/026* (2013.01); *B01L 2300/041* (2013.01); *B01L 2300/047* (2013.01); *B01L 2300/048* (2013.01); *B01L 2300/0609* (2013.01)

(58) Field of Classification Search
USPC .......................................... 422/102, 500, 50
See application file for complete search history.

(56) References Cited

U.S. PATENT DOCUMENTS

| | | |
|---|---|---|
| 4,034,884 A | 7/1977 | White |
| 4,076,592 A | 2/1978 | Bradley |
| 4,094,483 A | 6/1978 | Busch |
| 4,220,252 A | 9/1980 | Beall et al. |
| 4,416,984 A | 11/1983 | Wheeler, Jr. |
| 4,675,299 A | 6/1987 | Witty et al. |
| 4,903,869 A | 2/1990 | McKenna |
| 4,960,224 A * | 10/1990 | Boenisch ............... G01N 1/312 118/428 |
| 5,098,663 A | 3/1992 | Berthold et al. |
| 5,393,496 A | 2/1995 | Seymour |
| 5,424,040 A | 6/1995 | Bjornsson |
| 5,455,180 A | 10/1995 | Reid |
| 5,658,531 A | 8/1997 | Cope et al. |
| 5,665,398 A | 9/1997 | McCormick |
| 5,743,861 A | 4/1998 | Columbus et al. |
| 5,775,671 A | 7/1998 | Cote, Sr. |
| 5,833,213 A | 11/1998 | Ryan |
| 6,156,275 A | 12/2000 | Dumitrescu et al. |
| 6,207,408 B1 | 3/2001 | Essenfeld et al. |
| 6,375,028 B1 | 4/2002 | Smith |
| 6,524,530 B1 | 2/2003 | Igarashi et al. |
| 6,875,583 B2 | 4/2005 | Giberson et al. |
| 6,899,850 B2 | 5/2005 | Haywood et al. |
| 7,052,651 B2 | 5/2006 | Wang |
| 7,100,890 B2 | 9/2006 | Cote, Sr. et al. |
| 7,147,826 B2 * | 12/2006 | Haywood ............... B01L 3/502 422/547 |
| 7,270,959 B2 | 9/2007 | Hudak |
| 7,300,633 B2 | 11/2007 | Hudak et al. |
| 7,438,852 B2 | 10/2008 | Tung et al. |
| 7,837,939 B2 | 11/2010 | Tung et al. |
| 8,221,381 B2 | 7/2012 | Muir et al. |
| 8,449,844 B2 | 5/2013 | Wilkinson et al. |
| 8,802,034 B2 | 8/2014 | Bartfeld et al. |
| 8,802,038 B2 | 8/2014 | Wilkinson et al. |
| 8,813,954 B2 | 8/2014 | Newby |
| 9,056,317 B2 | 6/2015 | Bartfeld et al. |
| 9,234,823 B2 | 1/2016 | Vom et al. |
| 9,389,153 B2 | 7/2016 | Newby et al. |
| 9,468,925 B2 | 10/2016 | Bartfeld et al. |
| 9,687,843 B2 | 6/2017 | Bartfeld et al. |
| 2002/0048819 A1 | 4/2002 | Alley |
| 2002/0130100 A1 | 9/2002 | Smith |
| 2003/0021727 A1 | 1/2003 | Weyker et al. |
| 2003/0086830 A1 | 5/2003 | Haywood et al. |
| 2003/0087423 A1 | 5/2003 | Haywood et al. |
| 2003/0129738 A1 | 7/2003 | Sorenson et al. |
| 2004/0038269 A1 | 2/2004 | Birnboim |
| 2004/0052682 A1 | 3/2004 | Yokoi et al. |
| 2004/0106097 A1 | 6/2004 | Hutter et al. |
| 2004/0184954 A1 | 9/2004 | Guo et al. |
| 2005/0163660 A1 | 7/2005 | Wang |
| 2006/0154281 A1 | 7/2006 | Kahn et al. |
| 2006/0245977 A1 | 11/2006 | Bodner |
| 2007/0215496 A1 | 9/2007 | Scarborough |
| 2007/0258873 A1 | 11/2007 | Wu et al. |
| 2007/0275475 A1 | 11/2007 | Liang |
| 2008/0025877 A1 | 1/2008 | Alley |
| 2009/0024060 A1 | 1/2009 | Darrigrand et al. |
| 2009/0100944 A1 | 4/2009 | Newby |
| 2009/0104692 A1 | 4/2009 | Bartfeld et al. |
| 2009/0104699 A1 | 4/2009 | Newby et al. |
| 2009/0105611 A1 | 4/2009 | Wilkinson et al. |
| 2009/0183581 A1 | 7/2009 | Wilkinson et al. |
| 2010/0255484 A1 | 10/2010 | Halverson et al. |
| 2014/0302552 A1 | 10/2014 | Wilkinson et al. |
| 2016/0282238 A1 | 9/2016 | Newby et al. |
| 2017/0252741 A1 | 9/2017 | Bartfeld et al. |

FOREIGN PATENT DOCUMENTS

| | | |
|---|---|---|
| EP | 0215996 B1 | 7/1987 |
| EP | 0332753 A1 | 9/1989 |
| EP | 1154301 A1 | 9/2000 |
| EP | 1346692 A1 | 9/2003 |
| EP | 1804045 A1 | 7/2007 |
| FR | 2612297 A1 | 9/1988 |
| GB | 1234044 | 6/1971 |
| GB | 2278441 A | 11/1994 |
| JP | 4965889 | 6/1974 |
| JP | 59113886 A | 6/1984 |
| JP | 61502560 A | 11/1986 |
| JP | 4140635 A | 5/1992 |
| JP | 678746 A | 3/1994 |
| JP | 10281953 A | 10/1998 |
| JP | 2000510703 A | 8/2000 |
| JP | 2001194365 A | 7/2001 |
| JP | 2001228063 A | 8/2001 |
| JP | 200357232 A | 2/2003 |
| JP | 200469509 A | 3/2004 |
| JP | 2005532030 A | 10/2005 |
| JP | 2006260561 A | 9/2006 |
| JP | 2007508569 A | 4/2007 |
| JP | 2009507231 A | 2/2009 |
| JP | 2011502254 A | 1/2011 |
| WO | 7901131 A1 | 12/1979 |
| WO | 8600407 A1 | 1/1986 |
| WO | 03031065 A1 | 4/2003 |
| WO | 03044488 A1 | 5/2003 |
| WO | 03097240 A2 | 11/2003 |
| WO | 2006041297 A2 | 4/2006 |
| WO | 2006113854 A2 | 10/2006 |
| WO | 2007014741 A2 | 2/2007 |
| WO | 2007016935 A1 | 2/2007 |
| WO | 2007028202 A1 | 3/2007 |
| WO | 2008040812 A1 | 4/2008 |

\* cited by examiner

CLOSED KIT FOR TISSUE CONTAINMENT AND STABILIZATION FOR MOLECULAR AND HISTOPATHOLOGY DIAGNOSTICS

CROSS REFERENCE TO RELATED APPLICATION

This application is a continuation of U.S. patent application Ser. No. 12/257,057, filed Oct. 23, 2008, entitled "Closed Kit for Tissue Containment and Stabilization for Molecular and Histopathology Diagnostics", which claims priority to U.S. Provisional Patent Application No. 60/982,049, filed Oct. 23, 2007, entitled "Closed Kit for Tissue Containment and Stabilization for Molecular and Histopathology Diagnostics", the entire disclosures of each of which are herein incorporated by reference.

BACKGROUND OF THE INVENTION

Field of the Invention

The present invention relates to a closed kit system for storing a biological sample. More particularly, the present invention relates to a closed kit system for storing a biological tissue specimen in a reagent or, if so desired, in multiple reagents for molecular or diagnostic testing and/or histological testing.

Description of Related Art

Biological samples are often obtained by a researcher or clinician for diagnostic evaluation to determine the presence of certain diseases and to determine an appropriate treatment for the disease. Tissue samples are often obtained from a patient for molecular diagnostic and nucleic acid analysis, particularly RNA and DNA analysis, which have become common place in research for the treatment of numerous diseases. An essential requirement for accurate RNA and DNA analysis is the presence of high quality and intact RNA and DNA within the biological sample.

Oftentimes, the histologic or cytologic analysis will be performed immediately after the sample is removed from the patient or source to avoid molecular changes that may occur during storage. These changes, such as gene transcription, result from the degradation of the nucleic acids within the sample caused by exposure of an untreated sample to certain environmental stresses. However, analysis of the sample immediately after the sample is collected is often impossible or impractical. Therefore, it is necessary to provide a system for storing a sample under controlled conditions for a certain period of time while maintaining the structural and molecular integrity of the sample.

Traditionally, one way of accomplishing this storage is by submerging the sample in a single fixative reagent. A typical fixative reagent is ten percent (10%) formalin but may also include water, miscible alcohols, ethanol/acetone mixtures, and ethanol/acetic acid mixtures. The containers used for such storage are generally composed of a single integral cavity which could house an effective volume of reagent to treat a particular biological tissue sample. The biological tissue sample is placed in the container along with the reagent, the container is closed, and the sample is then stored and transported while being preserved by the fixative agent. An example of such a container can be seen in U.S. Pat. No. 7,147,826 to Haywood et al. Such containers have experienced some success in the industry, but are subject to certain limitations.

SUMMARY OF THE INVENTION

In one embodiment of the present invention a system for storing a biological sample includes a container having a closed end, an open end, and a sidewall extending therebetween defining a container interior. The container also includes a removable closure for enclosing the open end of the container, and a sample holder for housing a biological sample. The sample holder is insertable within the container interior. A port is disposed within one of the container and the removable closure, and an injection device is engageable with the port to allow a fluid to pass from within the injection device into the container interior.

The sample holder may be detachably connected to the removable closure. In one configuration, the port is disposed within the closure adjacent the sample holder. Optionally, the system includes a platform attached to the removable closure and adapted for receiving the sample holder. The sample holder may be positioned in fluid-access with the port such that fluid introduced through the port passes directly through the sample holder. In a further configuration, the sample holder is a histology cassette.

The system may also include a vent adapted to discharge a volume of air from the container interior. The vent may be disposed within the removable closure. Optionally, the vent transitions from a first closed position to a second open position when the volumetric pressure within the container interior reaches a threshold value. The removable closure and the open end of the container may be threadably matable.

In a further configuration, the injection device is a syringe. Optionally, the injection device may engage the port and, upon engagement, the port may transition from a first closed position to a second open position. A first fluid may be disposed within the container interior, and a second fluid may be disposed within the injection device, with the second fluid being different than the first fluid. In another configuration, the port may include a luer-activated valve.

In another embodiment of the present invention, a container for storing a biological sample includes a housing having a closed end, an open end, and a sidewall extending therebetween, defining a container interior. The housing also includes a removable closure for enclosing the open end of the housing, and a sample holder for housing a biological sample. The sample holder may be detachably connected to the removable closure, and insertable within the container interior. A port is disposed within the removable closure adjacent the sample holder. The port is adapted to allow a fluid to pass therethrough from a location exterior to the container to the container interior.

Optionally, the sample holder is a histology cassette. The container may also include a vent disposed within the removable closure adapted to discharge a volume of air from the container interior. A first fluid may be disposed within the container interior, and the port may be adapted to receive an injection device at least partially therein, for transferring a second fluid into the container interior, the second fluid different than the first fluid.

In yet another embodiment of the present invention, a method of storing a biological sample includes the step of providing a container having a housing having a closed end, an open end, and a sidewall extending therebetween defining a container interior. The container interior has a first fluid disposed therein. The container also includes a removable closure for enclosing the open end of the housing, and a sample holder housing a biological sample. The sample holder is detachably connected to the removable closure and is disposed within the first fluid of the container interior. The container also includes a port disposed within the removable closure adjacent the sample holder. The method includes the step of engaging an injection device containing a second fluid with the port, with the second fluid different than the first fluid. The method also includes the step of injecting the second fluid from the injection device through the port into the container interior.

Further details and advantages of the invention will become apparent upon reading the following detailed description in conjunction with the accompanying figures, wherein like parts are designated with like reference numerals throughout.

DETAILED DESCRIPTION OF PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

The closed kit system of the present invention allows for storage of a biological sample, such as a tissue sample for molecular and histology diagnostics, and in particular histopathology testing. Particularly, the system includes a container with an open end, a closed end, and a sidewall extending between the open end and the closed end defining a container interior. The system further includes an injection device and a port that allows fluid to pass from the injection device to the container interior. Accordingly, the injection device is capable of injecting a liquid medium into the container. In this manner, a tissue sample contained in the container may be handled or processed prior to contacting the tissue with the solution in the injection device. As will be discussed in greater detail herein, in one embodiment of the invention, the container interior does not contain a solution and represents a storage chamber, and the injection device includes a liquid medium, such as a reagent in the form of a tissue fixative solution for fixing a sample for histopathology diagnostics. In this manner, a tissue sample may be placed within the empty container interior, and when desired, the injection device may be used to introduce a reagent into the container interior so as to place the tissue sample in fluid contact with the reagent within the injection device.

In a further embodiment of the invention, the container interior may contain a first fluid or reagent, such as a tissue fixative solution, and the injection device may contain a second fluid or reagent, such as a nucleic acid stabilization solution, such that a tissue sample may be placed in the container interior in fluid contact with the first fluid for a desired time period, after which time the injection device may be used to inject a second fluid into the container interior so as to place the tissue sample in fluid contact with the second fluid. The embodiments described herein are representative of closed kit systems capable of use in any of these manners.

Figure 1:
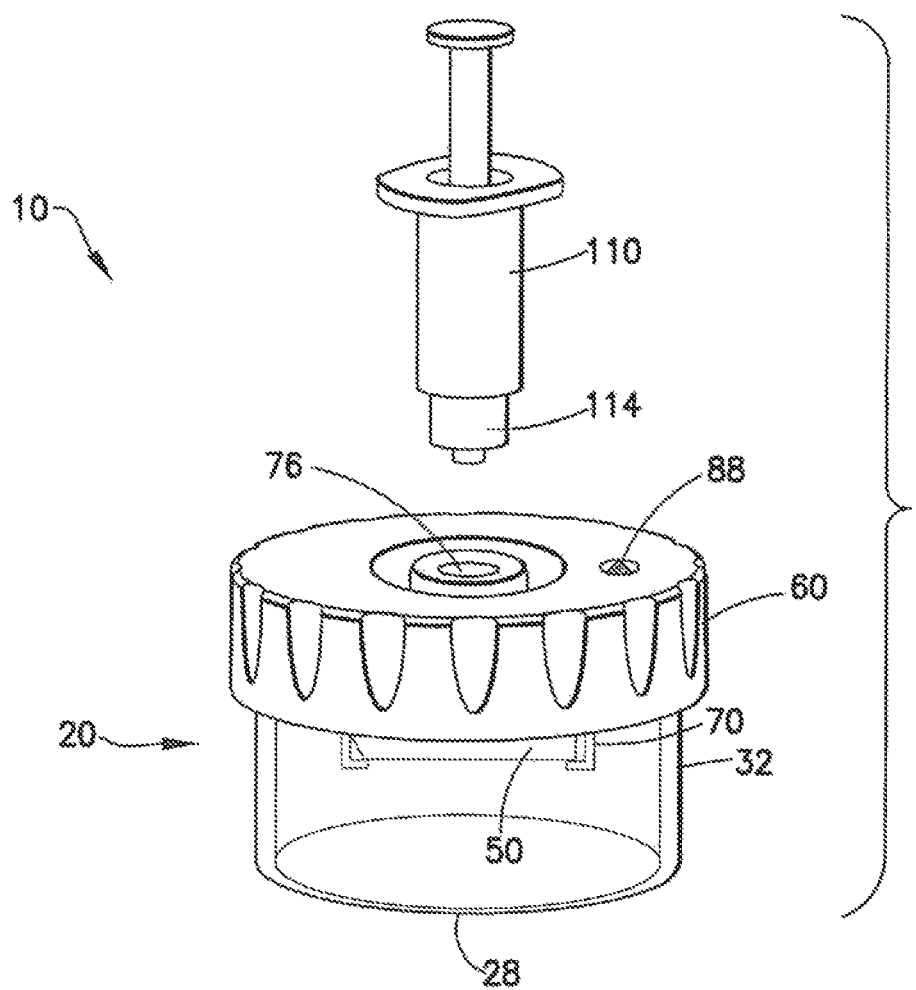
FIG. 1 is a perspective view of a closed kit system pursuant to one embodiment of the present invention.
Figure 2:
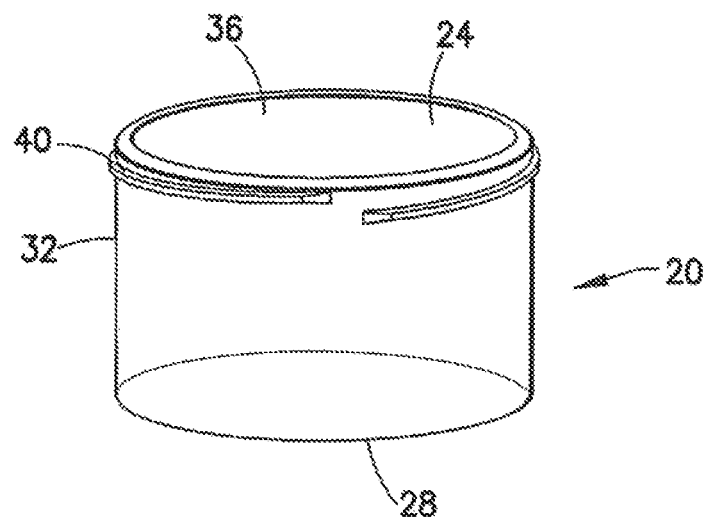
FIG. 2 is a perspective view of a container of the kit of FIG. 1 shown without a closure.

Referring to the drawings in which like reference characters refer to the like parts throughout the several views thereof, FIG. 1 generally depicts a closed kit system, such as system 10, for the storage of a biological tissue sample. System 10 generally includes a container 20, a sample holder 50, an injection device 110, and a port 76 which receives injection device 110 and allows fluid to pass from injection device 110 into container 20.

Container 20 includes a closed end 28, an open end 24, and a sidewall 32 extending between open end 24 and closed end 28 defining a container interior 36. In one embodiment, as depicted in FIG. 1, container 20 is cylindrical in shape, although it is contemplated that container 20 can be formed as any shape consistent with the intended use of the descriptions herein. Container 20 may be constructed of any known material, such as glass or plastic, and is desirably molded of a polymeric material.

Sample holder 50 is further provided for use with system 10, and is adapted to be received within the interior 36 of container 20. Sample holder 50 may be in the form of a conventional histology cassette (a "histo-cassette") as is known in the art for storing a biological tissue sample during preparation of the sample for diagnostic testing. Such sample holders or histo-cassettes are known for containing biological specimens during processing with fluids to prepare the specimen for later analyses. Typically, such sample holders or histo-cassettes are generally rectangular, planar housing structures having an internal cavity, with a plurality of openings through the wall surface to provide fluid flow through the housing. Often, a removable or openable cover encloses the structure, such as through a hinge situated along one end of the housing structure for providing a door-like cover to the housing structure. Also, a planar surface, which may be slanted, is often provided in such sample holders or histo-cassettes acting as a surface for labeling or writing. The dimensions for such a sample holder, for example, may include a height of about 0.3 inch (plus or minus 0.1 inch), a length of about 1.73 inches (plus or minus 0.1 inch), and a width of about 1.12 inches (plus or minus 0.1 inch). Examples of sample holders that may be useful herein are shown in U.S. Pat. No. 4,220,252 to Beall et al. and U.S. Pat. No. 4,034,884 to White, both of which are expressly incorporated herein by reference.

Figure 7A:
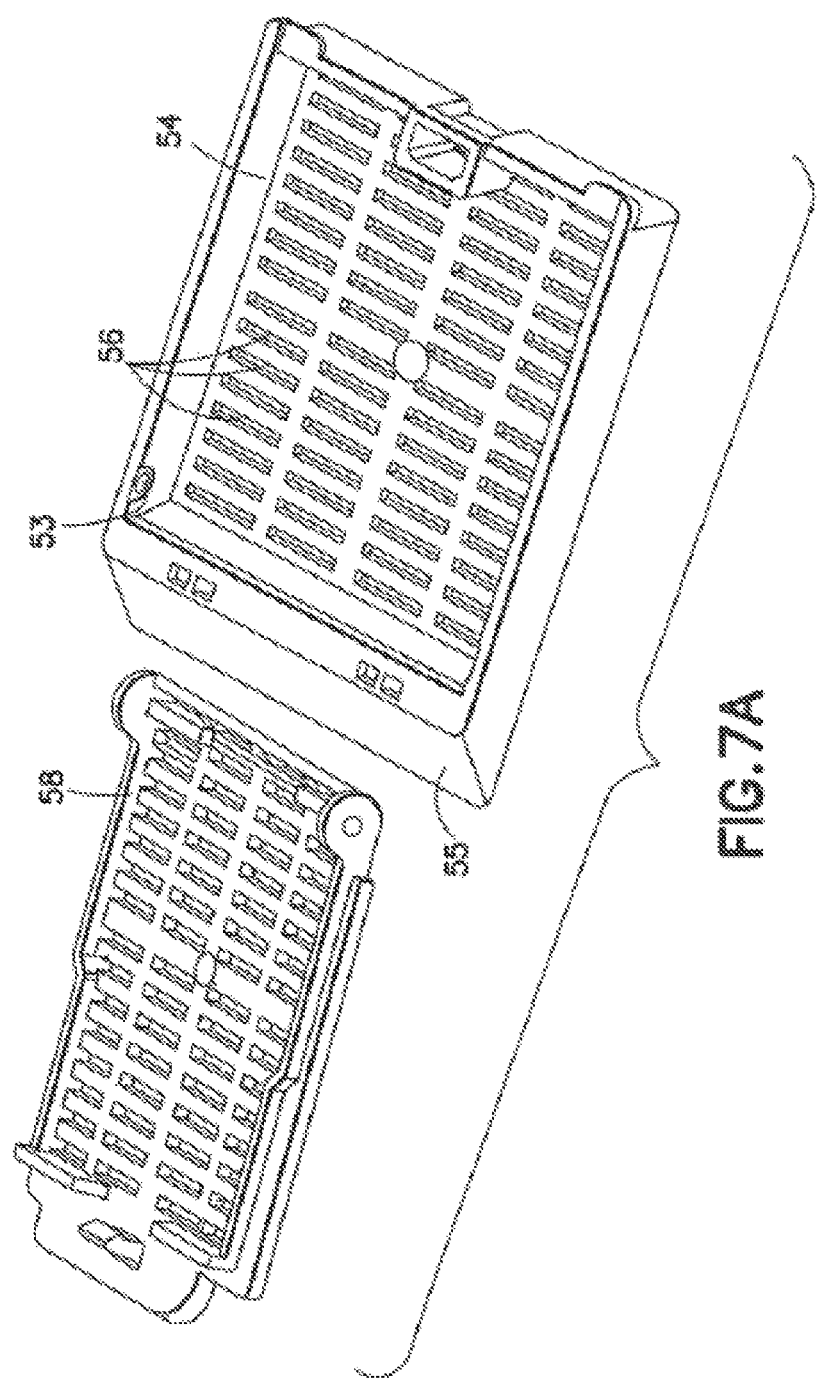
FIGS. 7A and 7B are perspective views of the sample holder according to one embodiment shown in the open and closed position, respectively.
Figure 7B:
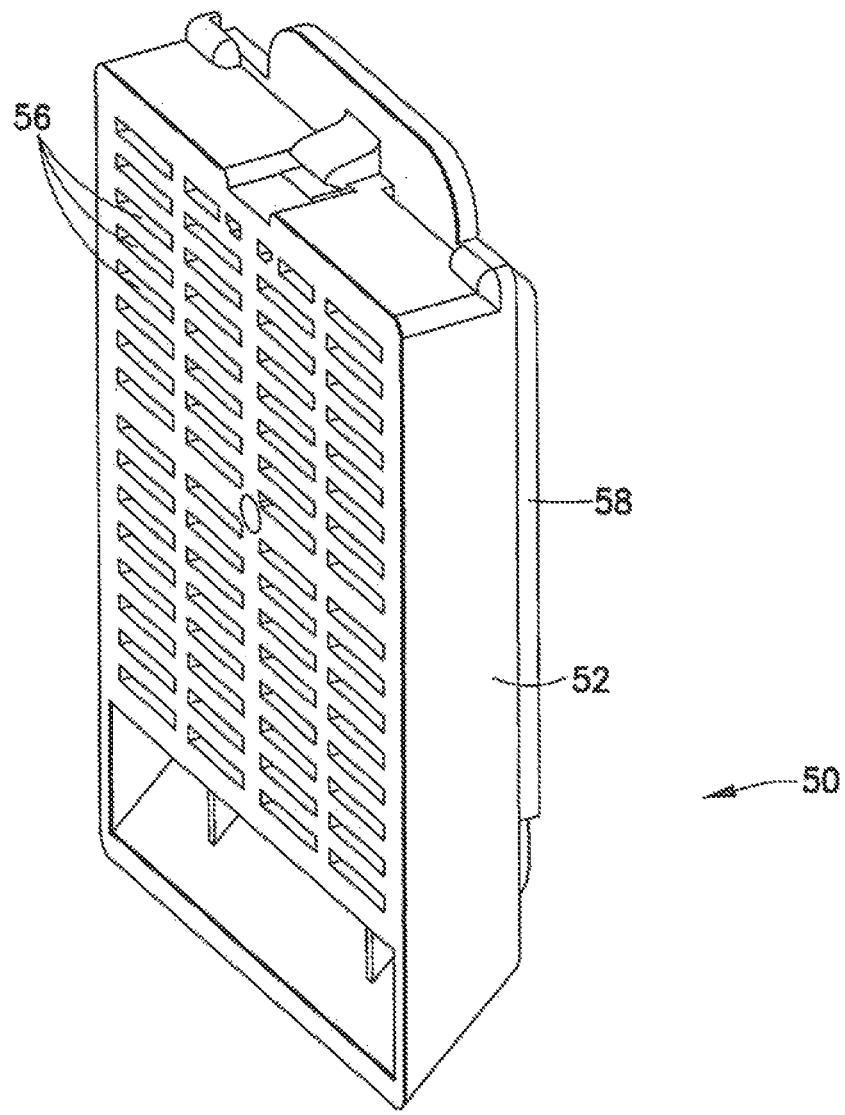
Figure 8:
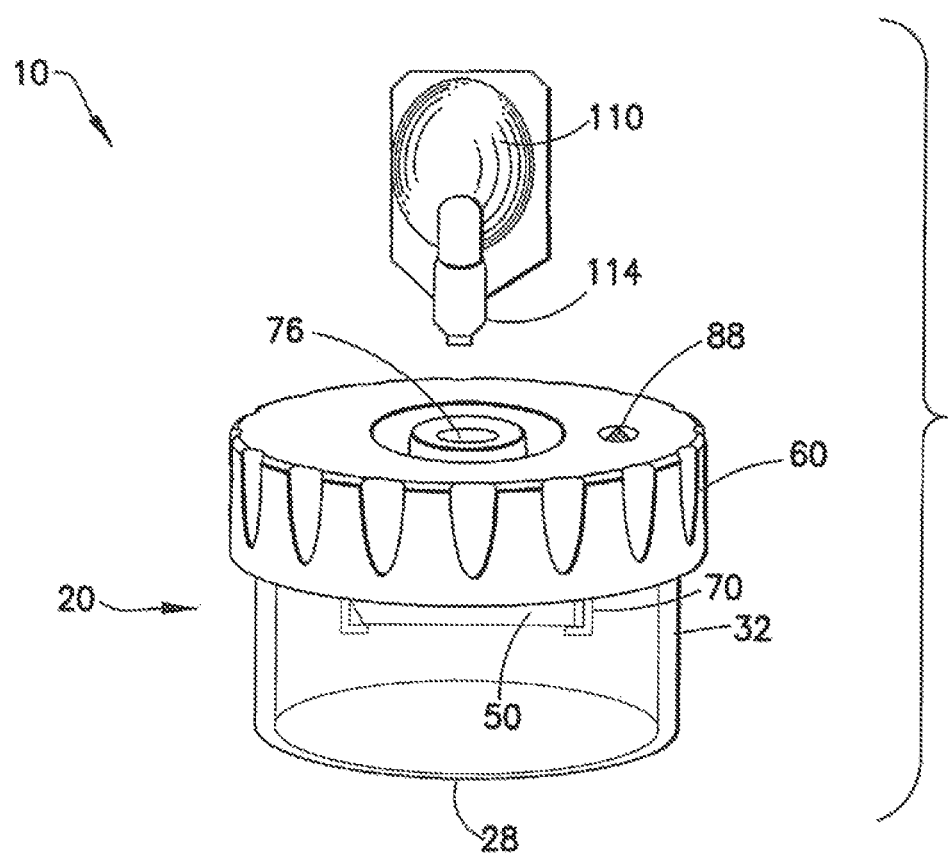
FIG. 8 is a perspective view of a closed kit system as in FIG. 1 shown with a different embodiment of the injection device.

For example, as shown in FIGS. 7A and 7B, sample holder 50 includes a generally rectangular planar housing 52 having opposing walls defining an internal cavity 54 for holding a biological tissue sample therein. At least one of the walls of housing 52 may be slanted, such as slanted wall 55, providing a surface for applying a label or for writing, so as to provide a mechanism for identification of a sample contained within sample holder 50 as appropriate. Housing 52 of sample holder 50 is a closable structure, and may include a hinged door-like structure 58 attached with housing 52 thereby permitting access to the internal cavity 54 for storing a tissue sample within or removing a tissue sample from internal cavity 54. The door-like structure 58 may be integrally formed with housing 52 so as to provide a unitary structure with the door 58 connected to housing 52 through a flap to provide a mechanism for pivoting door 58 with respect to housing 52, or door 58 may be otherwise connectable to housing 52, such as through a pivot point 53 acting as a hinge for opening door 58 from one side of housing 52 to gain access to the internal cavity 54. Housing 52 of sample holder 50 includes at least one, and preferably a plurality of fluid openings 56 adapted to allow fluid to flow therethrough. In this manner, when housing 52 is positioned within first chamber 20, fluid within first chamber 20 can flow through openings 56 and contact the biological tissue sample contained within internal cavity 44.

System 10 also includes a cover or closure 60 for enclosing open end 24. Closure 60 may consist of a removable or pierceable membrane, such as a wax or polymer material, that is affixed to container 20 and encloses open end 24. In one embodiment, shown in FIG. 3, closure 60 is represented as a cap or lid, desirably constructed of a molded polymer material. Closure 60 may be threadably matable with container 20 by way of first threaded members 64 disposed within closure 60 and corresponding second threaded members 40 disposed on the exterior of container sidewall 32 near open end 24. However, closure 60 can engage container 20 in any manner, such as a frictional fit, interlocking structural engagement, or other manner providing a liquid tight seal.

Figure 4:
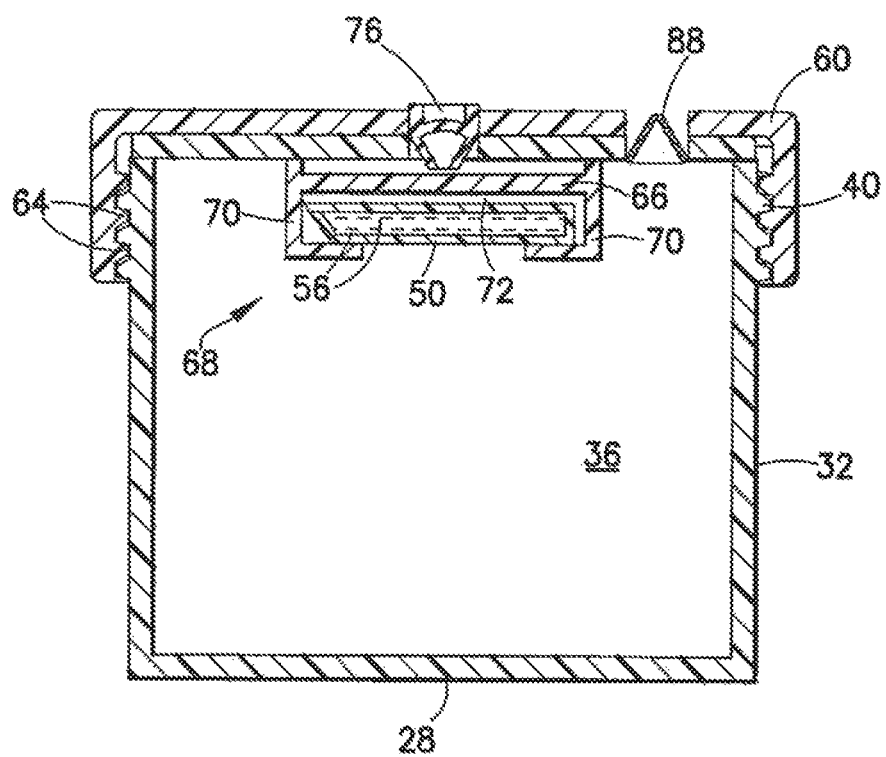
FIG. 4 is a cross-sectional view of the container shown in FIG. 3 taken across line A-A.
Figure 5:
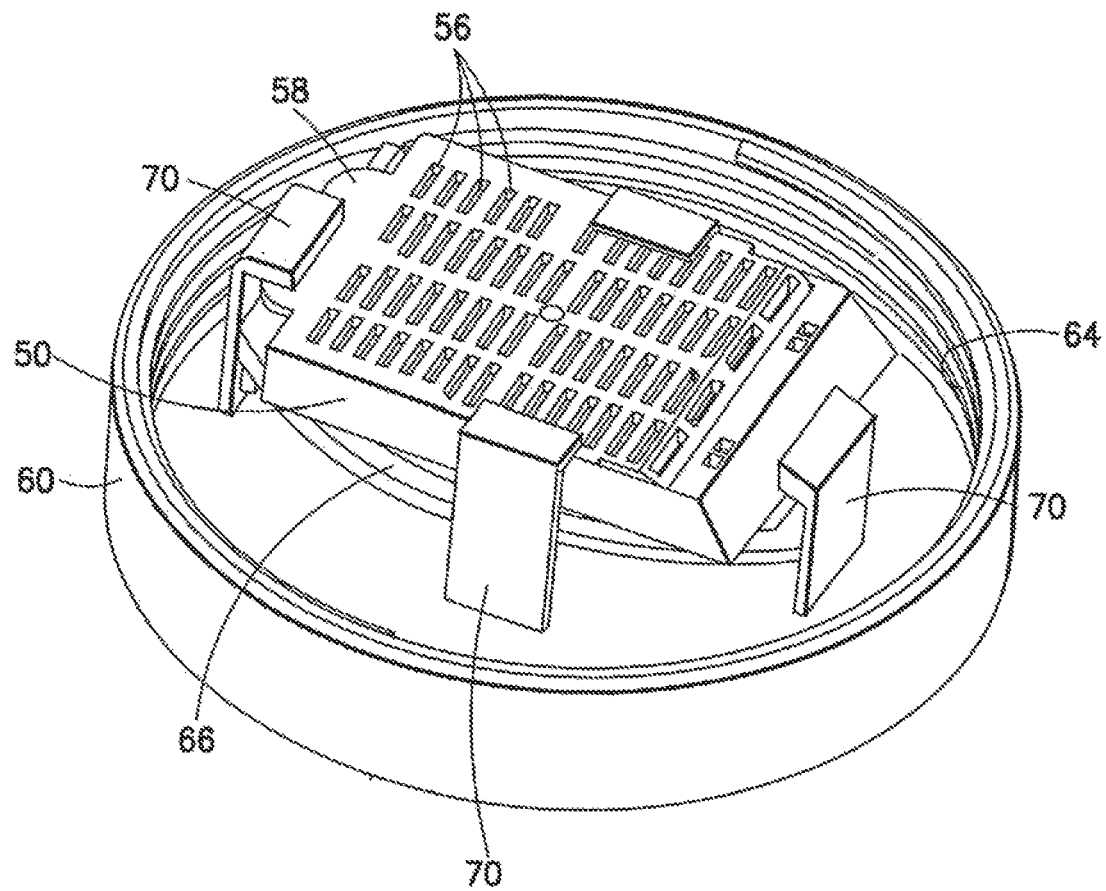
FIG. 5 is a perspective view of the closure of the kit of FIG. 1 oriented so the bottom surface faces upward showing a sample holder connected to the bottom surface.
Figure 6:
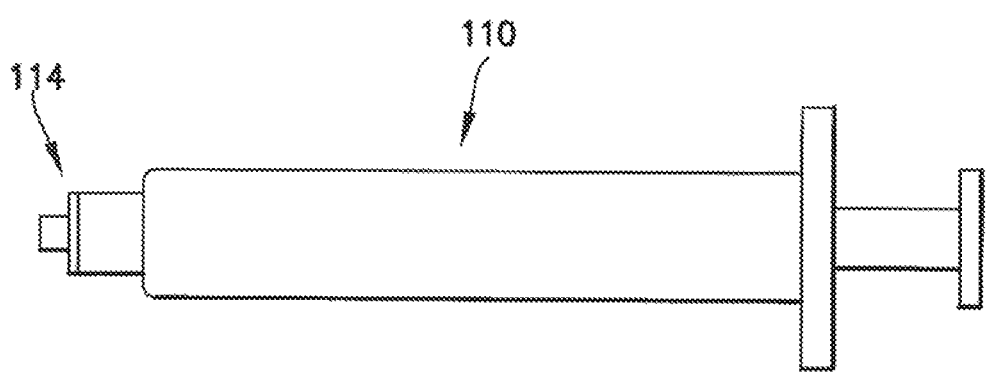
FIG. 6 is a side view of an injection device according to one embodiment.

System 10 optionally includes structure for mating sample holder 50 with closure 60. When sample holder 50 is mated with closure 60, sample holder 50 will enter container interior 36 when closure 60 engages container 20 as previously described. In one embodiment, mating is accomplished by providing sample holder 50 as an integral part connected to or formed with closure 60. Alternatively, sample holder 50 can be mated with closure 60 through a receiving member 68 extending from the bottom surface of closure 60 as shown in FIGS. 4-5. Receiving member 68 is capable of, detachably or permanently, securing sample holder 50 to closure 60 through, for example, a snap-fit engagement. In the embodiment shown in FIG. 5, receiving member 68 includes a platform 66 and a series of fingers 70 extending from a bottom surface of closure 60 for accommodating sample holder 50 therein. Platform 66 may include structure for maintaining sample holder 50 attached to closure 60 as shown in FIG. 5, such as in a snap-fit engagement and sample holder 50 may be releasable from platform 66. In particular, platform 66 may be a generally rectangular structure defining a rectangular recess for accommodating the general size and shape of sample holder 50. Platform 66 may include one or more fingers 70 extending therefrom for engaging with sample holder 50, thereby maintaining sample holder 50 within the recess or cavity 72 defined by platform 66. Such fingers 70 may be deflectable, such that when an edge of sample holder 50 adjacent the slanted wall 55 is held in place against a corresponding protrusion or finger (not shown) of the platform 66, and sample holder 50 is pushed into the recess of platform 66, fingers 70 deflect away from the walls of sample holder 50 and then return to their initial position, thereby snapping sample holder 50 in place. Fingers 70 may lock sample holder 50 in place permanently with respect to platform 66 and closure 60, or may be deflectable so as to remove sample holder 50 from platform 66 if desired.

Platform 66 may also be provided with a general shape so as to permit opening of door 58 of sample holder 50 while maintaining housing 52 of sample holder 50 contained therein, thereby providing access to the interior cavity 54 of sample holder 50 while sample holder 50 is held in place within platform 66 and with respect to closure 60.

In this arrangement, cavity 72 may be created between platform 66, the bottom surface of closure 60, and fingers 70. Fluid contained in container interior 36 may flow throughout cavity 72. Optionally, platform 66 contains a plurality of openings thereon allowing fluid within cavity 72 to flow through platform 66 and contact sample holder 50 and the biological sample contained therein. In one embodiment, when port 76 is integrated into closure 60, as discussed below, platform 66 can be positioned so that it is aligned with port 76, shown in FIG. 5. In this arrangement, when a fluid passes through port 76, the fluid quickly comes into contact with platform 66 and then sample holder 50 via the plurality of openings on platform 66.

System 10 also includes a port 76, which allows fluid to pass from injection device 110 to container interior 36 when port 76 is engaged by injection device 110 or, more particularly, a nozzle 114 thereof. Generally, port 76 is a valve normally in the closed position that can transition to an opened position upon insertion of nozzle 114 into an end of port 76 adapted to receive nozzle 114. When in the open position, port 76 allows fluid to flow through it in at least one direction, and port 76 is able to resist large back pressures when in the closed position. Any type of valve capable of allowing fluid to flow in at least one direction currently known or hereinafter discovered may be used as port 76. In one embodiment, port 76 is comprised of a luer-activated valve, which is commonly known in the industry. Examples of valves that can be used as port 76 within system 10 are shown in U.S. Pat. No. 5,775,671 to Cote, Sr. and U.S. Pat. No. 7,100,890 to Cote Sr. et al., both of which are expressly incorporated herein by reference.

Figure 3:
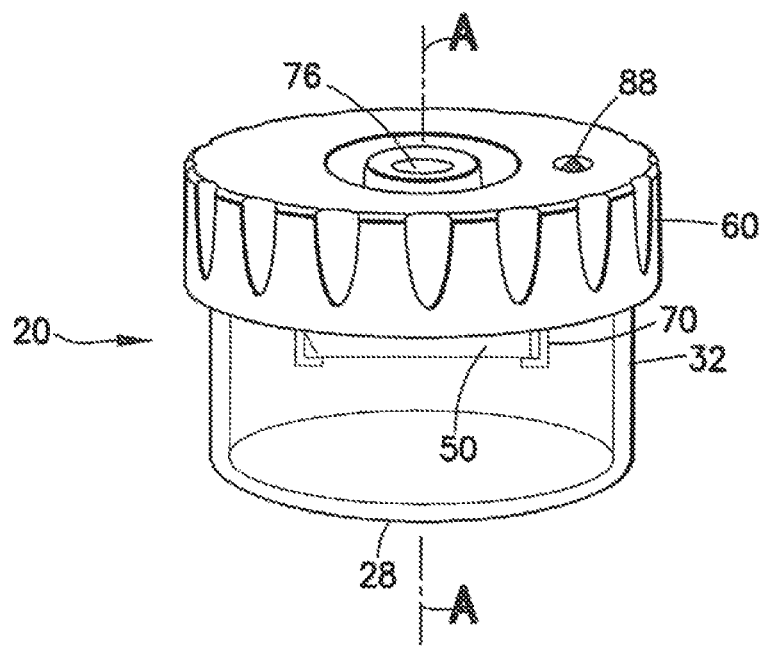
FIG. 3 is a perspective view of the container of the kit of FIG. 1 shown with the closure according to one embodiment.

In one embodiment, shown in FIGS. 3-4, port 76 is embedded, or integrated, into closure 60. In this embodiment, port 76 is comprised of two ends where one end is located adjacent to one surface of closure 60 and the other end is located adjacent to the other surface of closure 60. In this arrangement, port 76 forms a passageway through closure 60 allowing fluid to flow through closure 60 and into the container interior 36. In another embodiment, port 76 is embedded, or integrated, into sidewall 32 of container 20 and forms a passageway through which fluid flows through sidewall 32 before entering container interior 36. In a further embodiment, the port 76 is positioned adjacent the sample holder 50 to ensure sufficient wetting of a sample contained within the sample holder 50 by fluid injected from the injection device 110. In one configuration, the port 76 is disposed within the closure 60 directly above the sample holder 50, such that when fluid is injected from the injection device 110 through the port 76, the fluid directly contacts the sample disposed within the sample holder 50. Optionally, the platform 66 for holding the sample holder 50 may be positioned in fluid-access with the port 76 such that fluid introduced through the port 76 passes directly through the platform 66 and/or sample holder 50. The port 76 is adapted to allow a fluid to pass therethrough from a location exterior to the housing 52 and closure 60, to the container interior 36. The sample holder 50 may be positioned directly under the port 76, or provided in fluid communication with the port 76 through a series of baffles and/or channels for directed fluid therethrough.

The system 10 also includes an injection device 110, which is used to inject a reagent or solution into container interior 36 where it can contact a tissue sample that has been placed within container interior 36. Injection device 110 is received by port 76 and, once so received, is capable of injecting a fluid through the passageway created by port 76 into container interior 36. In one variation, injection device 110 includes a nozzle 114 which engages port 76. Optionally, nozzle 114 is a luer fitting. In one embodiment, injection device 110 may contain a set amount of solution or reagent within it, such as where injection device 110 is a syringe or a blister package, both of which are commonly known in the industry. In another embodiment, injection device 110 is connected to a reservoir or tank by, for example, a hose or tube. The reservoir contains the reagent or solution that is to be injected into container interior 36. In this embodiment, once injection device 110 is engaged with port 76, an amount of the solution can flow from the reservoir through injection device 110 and into container interior 36, where it can contact the tissue sample therein.

System 10 also may include a vent 88 for removing air or other media from container interior 36 that is displaced during the injection process. Vent 88 acts as a transitional barrier between container interior 36 and the external environment and is transitional from a first closed position where no media is released from container interior 36 to a second open position where media, preferably air, can flow from container interior 36 to the surrounding environment. Vent 88 can be any type of valve or stopcock currently known or hereinafter discovered. Vent 88 can operate to automatically release air from container interior 36 when the volumetric pressure within container interior 36 reaches a threshold value. Alternatively, vent 88 can be manually transitioned from the closed position to the open position. In one embodiment, vent 88 is embedded, and integrated, into closure 60 so that vent 88, when in the open position, forms a passageway through closure 60 into container interior 36. In another embodiment, vent 88 is embedded, and integrated, into sidewall 32 of container 20 thus creating a passageway through sidewall 32 to container interior 36 when in the open position.

System 10 may be assembled and provided with liquid media, such as solutions or reagents, stored within container interior 36 and/or injection device 110 at the point of manufacture. Alternatively, any such liquid media may be filled into container interior 36 and/or injection device 110 at any point prior to use, such as directly prior to inserting a tissue sample into sample holder 50.

System 10 may be provided for use with a one reagent scheme. In this manner, a single reagent solution, such as a tissue fixative like formalin, may be provided within injection device 110. Such fixative solutions stabilize the RNA within a tissue sample for conducting molecular diagnostic testing. Alternatively, system 10 may be provided for use with a two solution or a two reagent scheme. For example, a wash solution may be provided in injection device 110 so as to dilute the first reagent fixative in container interior 36. It is also possible that container interior 36 and injection device 110 each contain the same reagent since it may be advantageous to refresh the reagent in container interior 36 with additional reagent after a period of time has passed. Or, a first reagent solution, such as a tissue fixative like formalin, may be used within container interior 36, and a second reagent solution, such as a stabilizer in the form of a nucleic acid stabilization reagent for stabilizing the morphology of the tissue sample, may be provided within injection device 110.

Any reagents may be used with the container of the present invention. For example, the fixative may be formalin, ethanol solutions, Carnoy's solution I (ethanol and acetic acid), Carnoy's Solution II (ethanol, chloroform and acetic acid), methacarn (methanol, chloroform and acetic acid), Clark's fixative, Boonfix, and the like. A non-limiting list of commercially available fixatives includes, but is not limited to, MIRSKY'S FIXATIVE (available from National Diagnostics, Inc. of Atlanta, Ga.); GLYOFIX (available from Shandon Lipshaw, Inc. of Pittsburgh, Pa.); HISTOCHOICE (available from Amresco); HISTOFIX (available from Trend Scientific, New Brighton, Minn.); KRYOFIX (available from Merck); MICROFIX (available from Energy Beam Sciences, Inc., East Granbury, Conn.); NEOFIX (available from Merck); NOTOX (available from Earth Safe Industries, Inc., Belle Mead, N.J.); OMNIFIX II and OMNIFIX 2000 (available from AnCon Genetics, Inc, Mellville, N.Y.); PREFER (available from Anatech Ltd, Battle Creek, Mich.); PRESERVE (available from Energy Beam Sciences, Inc., East Granbury, Conn.); SAFEFIX II (available from Thermo Fischer Scientific, Inc.); STATFIX (available from StatLab Medical Products, Inc. of Lewisville, Tex.); STF (Streck Tissue Fixative, available from Streck Laboratories, Omaha, Nebr.); UMFIX (available from Sakura Finetek USA, Inc., Torrance, Calif.); and FINEFIX (available from Milestone Medical of Shelton, Conn.). Commercially available stabilizers include, but are not limited to, RNALATER (available from Ambion, Inc., Austin Tex.); and RNEASY (available from Qiagen, Inc., Valencia, Calif.). Any other reagents known or hereafter discovered for use as fixatives and/or stabilizers are intended as useful in the present invention.

In use, a biological sample, such as a tissue sample extracted from a patient for molecular or histology diagnostic testing, is placed within internal cavity 54 of sample holder 50. In embodiments where sample holder 50 is mated with closure 60, the tissue sample may be placed within sample holder 50 after closure 60 is removed from container 20, either with sample holder 50 still connected to closure 60 or after first removing sample holder 50 from closure 60 and then reattaching thereto once the tissue sample has been placed in sample holder 50. Alternatively, if sample holder 50 is not mated with closure 60, sample holder 50 containing the tissue sample therein can be directly placed into container interior 36 once closure 60 has been removed. In this embodiment, after sample holder 50 has been placed in container interior 36, closure 60 should be used to enclose open end 24 of container 20.

It is noted that the Figures generally depict sample holder 50 as being held by receiving member 68 at a position generally adjacent the top end of container interior 36, however the precise location of sample holder 50 within container interior 36 can be tailored depending on the volume of solution within container interior 36. For example, it is contemplated that receiving member 68 may be structured so as to position sample holder 50 within container interior 36 at a location substantially midway between first end 24 and second end 28. In this manner, a smaller volume of solution within container interior 36 will still ensure full contact of sample holder 50 (and any sample contained therein) with any solution within container interior 36.

In embodiments including a one reagent scheme as discussed above, the tissue sample at this point is contained within sample holder 50 in container interior 36 in isolation from contact with any reagents. When it is desired to contact the tissue sample with the reagent, the user engages injection device 110 with port 76 and injects the reagent contained within injection device 110 through port 76 and into container interior 36. Optionally, in order to allot for the increased volume within container interior 36 due to the introduction of the reagent from injection device 110, vent 88 releases the necessary volume of air from container interior 36 immediately before or during the injection process. After the tissue sample has been in contact with the reagent for a desired time, closure 60 can be removed giving user access to sample holder 50 and the tissue sample therein for further diagnostic testing.

In embodiments including a two reagent scheme as discussed above, when sample holder 50 is placed within container interior 36, the tissue sample is placed in contact with the first reagent contained within container interior 36, with such reagent flowing through fluid openings 56 of sample holder 50, thereby contacting the tissue sample contained within internal cavity 54 thereof. The tissue sample can be maintained in contact with the reagent within container interior 36 for a specified time period after which time injection device 110 can be used to inject a second reagent into container interior 36 as discussed above. Again, to allot for the increased volume within container interior 36 due to the introduction of the reagent from injection device 110, vent 88 may release the necessary volume of media, preferably air, from container interior 36 immediately before or during the injection process. In embodiments including a two reagent scheme, it may be advantageous that the total combined volume of reagent contained within container interior 36 and injection device 110 be no more than the total volume of container interior 36 to ensure that all of the second reagent contained within injection device 110 enters container interior 36 without first having to remove any reagent therefrom. After the tissue sample has had sufficient contact with the second reagent, closure 60 can be removed giving user access to the tissue sample for further diagnostic testing.

In embodiments where sample holder 50 is connected with closure 60, access to the tissue sample contained within sample holder 50 can be achieved by removing closure 60 from container 20 and inverting it, placing the outer surface on a counter, thereby providing sample holder 50 exposed. Any fluid that is contained within sample holder 50 can drip downward within the bottom or internal surface of closure 60 and be caught by the rim surrounding closure 60, thereby preventing any leakage or spillage onto the counter surface. Sample holder 50 may be openable while sample holder 50 is connected with closure 60, thereby providing simple access to the tissue sample contained therein, and providing a proper support for maintaining sample holder 50 in place without having to physically contact any portion of sample holder 50 to hold it in place while accessing the sample, thus preventing any potential for contamination of the sample based on contact by the user.

Thereafter, container 20 may be washed and reused, or more preferably, will be discarded to prevent cross-contamination with other samples. Injection device 110 may be refilled with, preferably, the same solution and then reused or it may be discarded.

While embodiments of the present invention are satisfied in many different forms, there is shown in the figures and described herein in detail, specific embodiments of the invention, with the understanding that the present disclosure is to be considered as exemplary of the principles of the invention and is not intended to limit the invention to the embodiments illustrated. Various other embodiments will be apparent to, and readily made by those skilled in the art, without departing from the scope and spirit of the invention. For example, while the disclosure and drawings depict a system including one injection device to inject a reagent into the container, it is contemplated that additional injection devices may be provided, such that the system may include any number of injection devices with varying reagents. The scope of the invention will be measured by the appended claims and their equivalents.

What is claimed is:

1. A system for storing a biological sample, the system comprising:
   a container having a closed end, an open end, and a sidewall extending therebetween, defining a container interior;
   a removable closure for enclosing the open end of the container;
   a sample holder having a housing with opposing walls and a closable door together defining an internal cavity for housing a biological sample, the sample holder insertable within the container interior and having a plurality of fluid openings extending through the opposing walls and the closable door and in fluid communication with the internal cavity;
   a port disposed within the removable closure, wherein the port is a valve; and
   an injection device engageable with the port to allow a fluid to pass from within the injection device into the container interior,
   wherein the sample holder is connected with the removable closure through a receiving member, and
   wherein the receiving member comprises:
      a platform which is aligned with the port, the platform having a plurality of openings such that, when a fluid passes through the port, the fluid comes into contact with the platform and enters the internal cavity of the sample holder via the plurality of openings on the platform and the plurality of fluid openings on the sample holder; and
      a plurality of fingers, wherein the plurality of fingers extend from a bottom surface of the removable closure to accommodate the sample holder within the receiving member such that the platform is positioned between the sample holder and the port.

2. The system of claim 1, further comprising a vent adapted to discharge a volume of air from the container interior, wherein the vent transitions from a first closed position to a second open position when the volumetric pressure within the container interior reaches a threshold value.

3. The system of claim 1, wherein the port is adapted to allow a fluid to pass therethrough from a location exterior to the container interior.

4. The system of claim 1, wherein the injection device is a syringe.

5. The system of claim 1, wherein the injection device engages the port and, upon engagement, the port transitions from a first closed position to a second open position.

6. The system of claim 1, further comprising a first fluid disposed within the container interior and a second fluid disposed within the injection device.

7. The system of claim 6, wherein the second fluid is different than the first fluid.

8. The system of claim 1, wherein the sample holder is detachably connected to the removable closure.

9. The system of claim 1, wherein the sample holder is a histology cassette.

10. The system of claim 1, wherein the removable closure and the open end of the container are threadably matable.

11. A container for storing a biological sample, the container comprising:
   a housing having a closed end, an open end, and a sidewall extending therebetween, defining a container interior;
   a removable closure for enclosing the open end of the housing;
   a sample holder having a housing with opposing walls and a closable door together defining an internal cavity for housing a biological sample, the sample holder insertable within the container interior and having a plurality of fluid openings extending through the opposing walls and the closable door and in fluid communication with the internal cavity; and
   a port disposed within the removable closure, the port adapted to engage with an injection device to allow a fluid to pass from within the injection device into the container interior,
   wherein the sample holder is connected with the removable closure through a receiving member, and
   wherein the receiving member comprises:
      a platform which is aligned with the port, the platform having a plurality of openings such that, when a fluid passes through the port, the fluid comes into contact with the platform and enters the internal cavity of the sample holder via the plurality of openings on the platform and the plurality of fluid openings on the sample holder; and
      a plurality of fingers, wherein the plurality of fingers extend from a bottom surface of the removable closure to accommodate the sample holder within the receiving member such that the platform is positioned between the sample holder and the port.

12. The container of claim 11, further comprising a vent adapted to discharge a volume of air from the container interior.

13. The container of claim 12, wherein the vent is disposed within the removable closure.

14. The container of claim 12, wherein the vent transitions from a first closed position to a second open position when the volumetric pressure within the container interior reaches a threshold value.

15. The container of claim 11, wherein the port is a valve.

16. The container of claim 11, wherein the port is a luer-activated valve.

17. The container of claim 11, wherein the port is adapted to allow a fluid to pass therethrough from a location exterior to the container interior.

18. The container of claim 11, wherein the sample holder is detachably connected to the removable closure.

19. The container of claim 11, wherein the sample holder is a histology cassette.

20. The container of claim 11, wherein the removable closure and the open end of the container are threadably matable.

21. A method of storing a biological sample, comprising the steps of:
   providing a container comprising:
      a housing having a closed end, an open end, and a sidewall extending therebetween, defining a container interior having a first fluid disposed therein;
      a removable closure for enclosing the open end of the container;
      a sample holder having a housing with opposing walls and a closable door together defining an internal cavity for housing a biological sample, the sample holder disposed within the first fluid of the container interior and having a plurality of fluid openings extending through the opposing walls and the closable door and in fluid communication with the internal cavity of the sample holder; and
      a port disposed within the removable closure,
      wherein the sample holder is connected with the removable closure through a receiving member, and
      wherein the receiving member comprises:
         a platform having a plurality of openings, the platform being aligned with the port; and
         a plurality of fingers, wherein the plurality of fingers extend from a bottom surface of the removable closure to accommodate the sample holder within the receiving member such that the platform is positioned between the sample holder and the port;
   engaging an injection device configured for containing a second fluid within the port, the second fluid different than the first fluid; and
   injecting the second fluid from the injection device through the port, passing the second fluid directly through the sample holder, into the container interior such that when a fluid passes through the port, the fluid comes into contact with the platform and enters the internal cavity of the sample holder via the plurality of openings on the platform and the plurality of fluid openings on the sample holder.

\* \* \* \* \*